United States Patent
Lu

(10) Patent No.: US 9,432,525 B2
(45) Date of Patent: Aug. 30, 2016

(54) METHODS AND SYSTEMS FOR TOP-UP

(71) Applicant: Dat The Lu, Duluth, GA (US)

(72) Inventor: Dat The Lu, Duluth, GA (US)

( * ) Notice: Subject to any disclaimer, the term of this patent is extended or adjusted under 35 U.S.C. 154(b) by 0 days.

(21) Appl. No.: 14/454,668

(22) Filed: Aug. 7, 2014

(65) Prior Publication Data

US 2015/0044990 A1 Feb. 12, 2015

Related U.S. Application Data

(60) Provisional application No. 61/863,407, filed on Aug. 7, 2013.

(51) Int. Cl.
| | |
|---|---|
| *H04M 17/00* | (2006.01) |
| *H04W 8/04* | (2009.01) |
| *H04M 17/02* | (2006.01) |
| *H04W 4/24* | (2009.01) |
| *H04M 15/00* | (2006.01) |
| *H04W 8/18* | (2009.01) |

(52) U.S. Cl.
CPC ........... *H04M 17/204* (2013.01); *H04M 17/02* (2013.01); *H04M 17/20* (2013.01); *H04M 17/205* (2013.01); *H04M 17/206* (2013.01); *H04W 4/24* (2013.01); *H04W 8/04* (2013.01); *H04M 15/09* (2013.01); *H04M 15/75* (2013.01); *H04M 2017/12* (2013.01); *H04M 2017/241* (2013.01); *H04M 2017/243* (2013.01); *H04W 8/18* (2013.01)

(58) Field of Classification Search
CPC ............ H04M 15/09; H04M 17/204; H04M 17/205; H04M 2017/241; H04M 17/206; H04M 15/75; H04M 2017/12; H04M 17/243; H04W 8/04
See application file for complete search history.

(56) References Cited

U.S. PATENT DOCUMENTS

| | | | | |
|---|---|---|---|---|
| 6,792,271 | B1 * | 9/2004 | Sherman et al. | .......... 455/432.1 |
| 6,934,529 | B2 * | 8/2005 | Bagoren et al. | .............. 455/406 |
| 8,000,455 | B1 * | 8/2011 | Van Haaften et al. | .... 379/88.19 |
| 8,160,961 | B1 | 4/2012 | Haataja et al. | |
| 2003/0166396 | A1 * | 9/2003 | Vermelle et al. | ............. 455/406 |
| 2004/0009760 | A1 * | 1/2004 | Laybourn et al. | ............ 455/405 |
| 2005/0250501 | A1 * | 11/2005 | Mobin et al. | ................. 455/445 |

(Continued)

FOREIGN PATENT DOCUMENTS

| | | |
|---|---|---|
| KR | 2004-0068768 | 8/2004 |
| KR | 2004-0100217 | 12/2004 |

(Continued)

OTHER PUBLICATIONS

International Preliminary Report on Patentability, Chapter I of the PCT, for PCT/US2014/050240, dated Feb. 18, 2016.*

*Primary Examiner* — Kenneth Lam

(74) *Attorney, Agent, or Firm* — Minh N. Nguyen; Next IP Law Group LLC

(57) ABSTRACT

Methods and systems for top-up are provided. A representative top-up system includes an interface module that receives and transmits a phone number associated with a phone user's account; and a top-up gateway that receives and transmits the phone number from the interface module and requests for a telephone service company associated with the phone number to a home location register (HLR) look up service. The top-up gateway tops up phone minutes and/or balance of money of the phone user's account associated with the phone number based on the phone number, and requested telephone service company.

20 Claims, 14 Drawing Sheets

(56) References Cited

U.S. PATENT DOCUMENTS

| | | | |
|---|---|---|---|
| 2008/0139171 A1* | 6/2008 | Bernath | 455/406 |
| 2008/0233982 A1* | 9/2008 | Smith et al. | 455/466 |
| 2011/0029862 A1* | 2/2011 | Scott et al. | 715/261 |
| 2011/0270747 A1* | 11/2011 | Xu | 705/40 |
| 2012/0011228 A1 | 1/2012 | Corda et al. | |
| 2014/0038545 A1* | 2/2014 | Ramprasad et al. | 455/405 |

FOREIGN PATENT DOCUMENTS

| | | |
|---|---|---|
| KR | 2008-0114651 | 12/2008 |
| KR | 2010-0037297 | 4/2010 |
| WO | WO 03/102887 A1 | 12/2003 |
| WO | WO 2010/131226 A4 | 11/2010 |
| WO | WO 2011/161698 A1 | 12/2011 |
| WO | WO 2012/114142 A1 | 8/2012 |

* cited by examiner

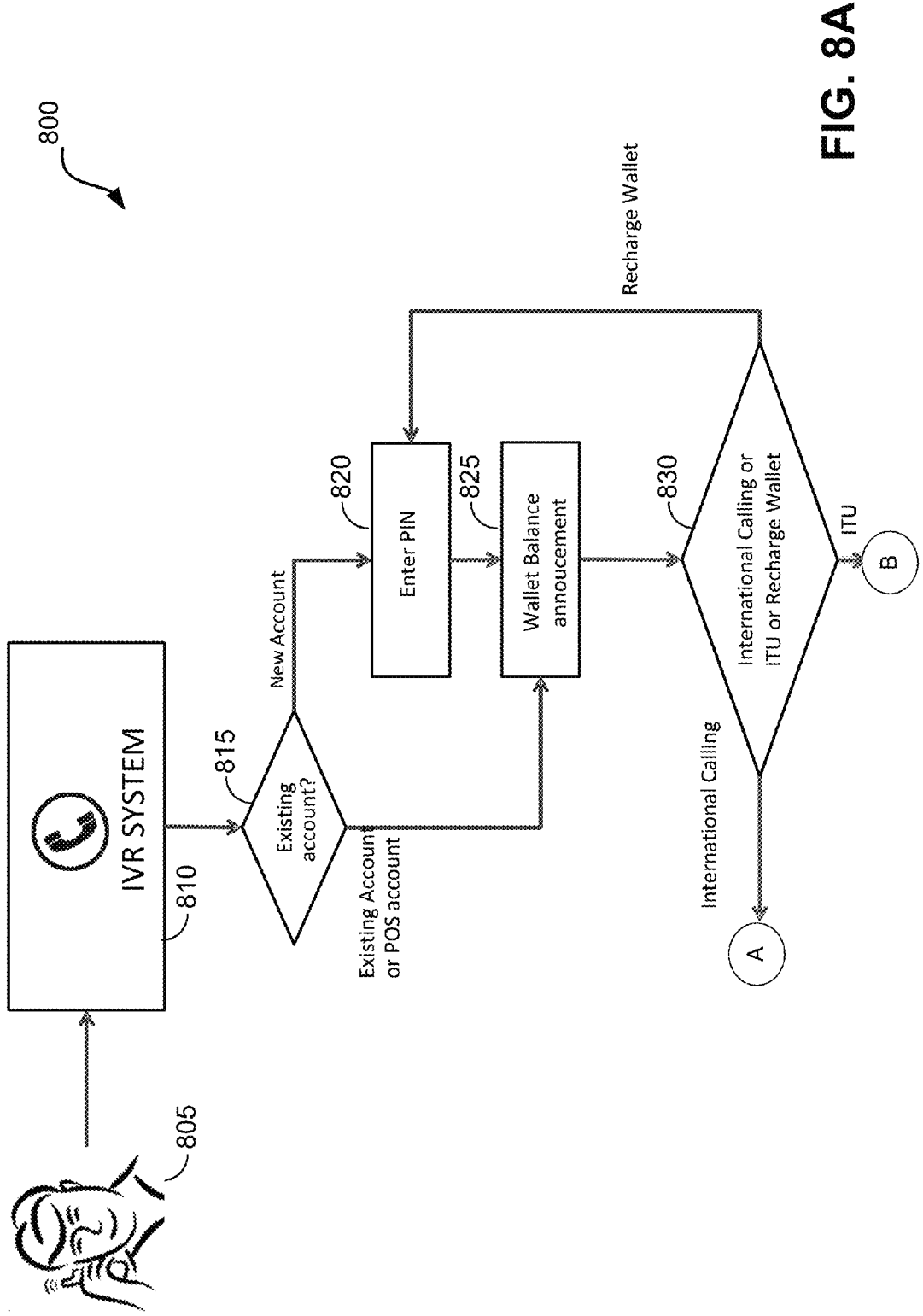

METHODS AND SYSTEMS FOR TOP-UP

CROSS REFERENCE TO RELATED APPLICATIONS

This application claims the benefit of U.S. provisional application entitled, "METHODS AND SYSTEMS FOR TOP-UP," having Ser. No. 61/863,407, filed on Aug. 7, 2013, all of which are entirely incorporated herein by reference.

TECHNICAL FIELD

This disclosure is related to top-up systems (e.g., mobile real time replenishment (RTR) systems). This top-up system uses computing logics programmed in a computing system to top-up, recharge, add, and/or transfer telephone minutes or money to a phone user account.

BACKGROUND

Top-up systems for phone services having a portal web interface exist today in commerce. Phone users typically provide several information about a phone number in order to top-up, recharge, add, and/or transfer telephone minutes or money. The information includes a telephone number, the country that the telephone number is used in, and the mobile telephone service company that the telephone number is associated with.

Desirable in the art is an improved top-up system for phone services that would improve upon the conventional top-up system.

SUMMARY

Methods and systems for top-up are provided. A representative top-up system includes an interface module that receives and transmits a phone number associated with a phone user's account; and a top-up gateway that receives and transmits the phone number from the interface module and requests for a telephone service company associated with the phone number to a home location register (HLR) look up service. The top-up gateway tops up phone minutes and/or balance of money of the phone user's account associated with the phone number based on the phone number, and requested telephone service company.

BRIEF DESCRIPTION OF THE DRAWINGS

The accompanying drawings illustrate preferred embodiments of the invention, as well as other information pertinent to the disclosure, in which:

FIGS. 8A-B are flowcharts for processing a top-up and/or a money transfer in a top-up system using a mobile wallet in accordance with an embodiment of the disclosure;

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a phone user provides the phone number and the improved top-up system can determine the other information, such as the mobile telephone service company that the telephone number is associated with, based on the provided phone number to process the top-up, recharge, addition, and/or transfer of telephone minutes or money. This makes any phone-related transaction easier and more convenient for a user so that the user does not need to input the geographical location (e.g., Vietnam, Mexico, etc.) and telephone service company (e.g., MobiFone™, TelCel™, etc.) of the inputted telephone number into the top-up system.

Figure 1:
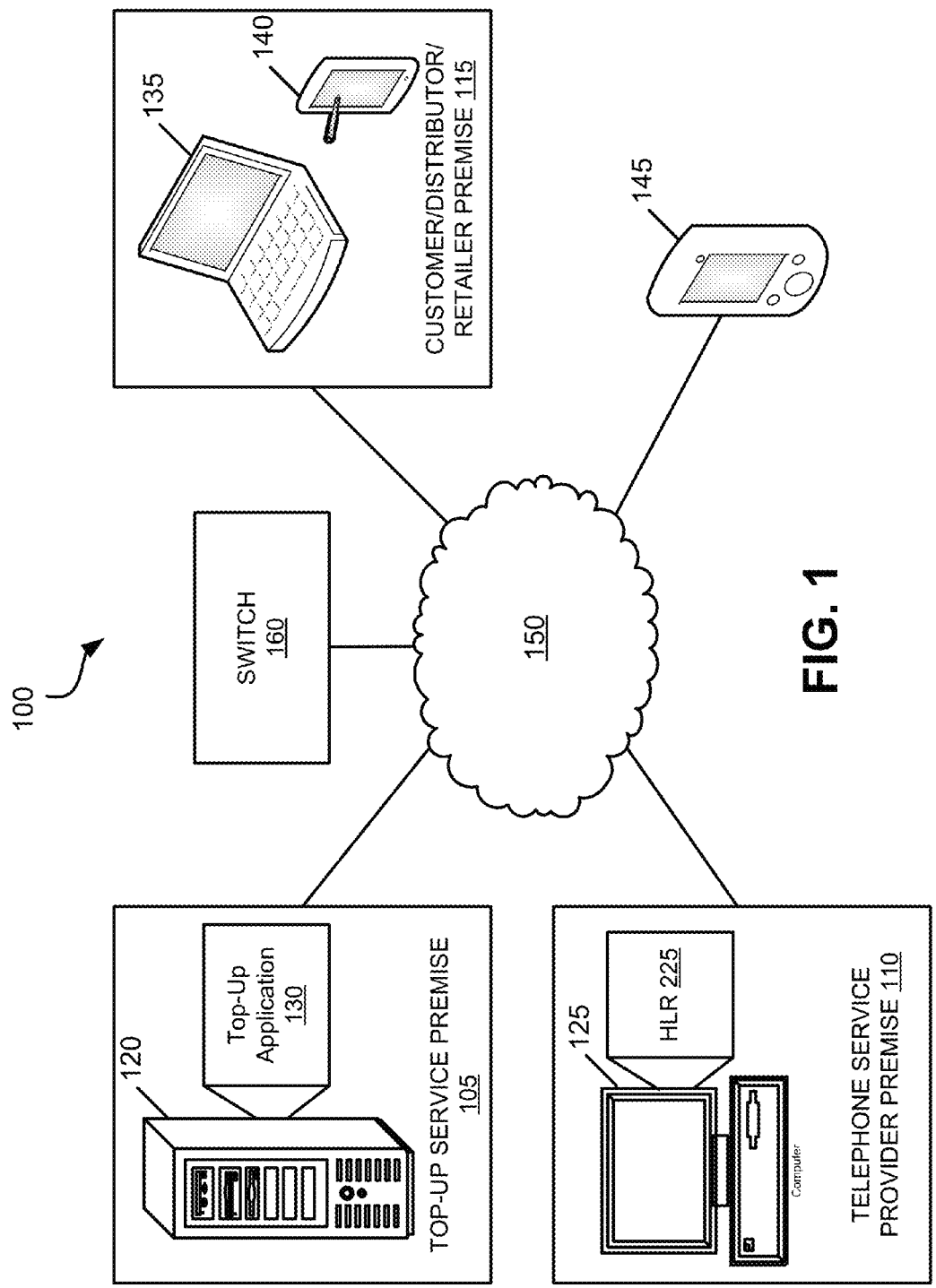
FIG. 1 is a system view of a top-up system in accordance with an embodiment of the disclosure.

Referring to FIG. 1, the top-up system 100 generally includes at least one top-up service premise 105 that can include a top-up server 120, at least one telephone service provider premise 110, at least one switch 160 (e.g. a competitive local exchange carrier (CLEC)), and a customer/distributor/retailer premise 115 that can include a top-up server 120, a laptop 135, and tablets 130, 140, and portable devices 145 that can connect to the Internet. The premises 105, 110, 115 and the portable devices 145 can be connected to a network 150, such as the Internet, telephone network system, and cellular network system.

The top-up server 120 establishes phone calls based on how many minutes and/or how much money a user has in the phone user's account. The top-up server 120 includes a top up application 130 that enables a phone user to top-up phone minutes and/or money on the phone user's account or another phone user's account. The top up application 130 also enables the phone user to transfer phone minutes and money from the phone user's account to another phone user's account. It should be appreciated that although the top up application 130 is shown at the top-up server 120, the top up application 130 entirely or partially can be located anywhere in the top-up system 100, such as that shown in FIG. 1.

It should also be appreciated that the top up application 130 can facilitate processing a top-up and/or a money transfer in at least the following systems: a top-up system 100 using an interactive voice response (IVR) system, and a pin and fixed denomination platform, which will be described further in connection to FIGS. 3-4; a top-up system 100 using a short message system (SMS), and a pin and fixed denomination platform, which will be described further in connection to FIG. 5; a top-up system 100 using a real time refill (RTR) and select denomination platform, which will be described further in connection to FIG. 6; a top-up system 100 using an interactive application and open denomination platform, which will be described further in connection to FIG. 7; and a top-up system 100 using a mobile wallet, which will be described further in connection to FIGS. 8-9.

Figure 2:
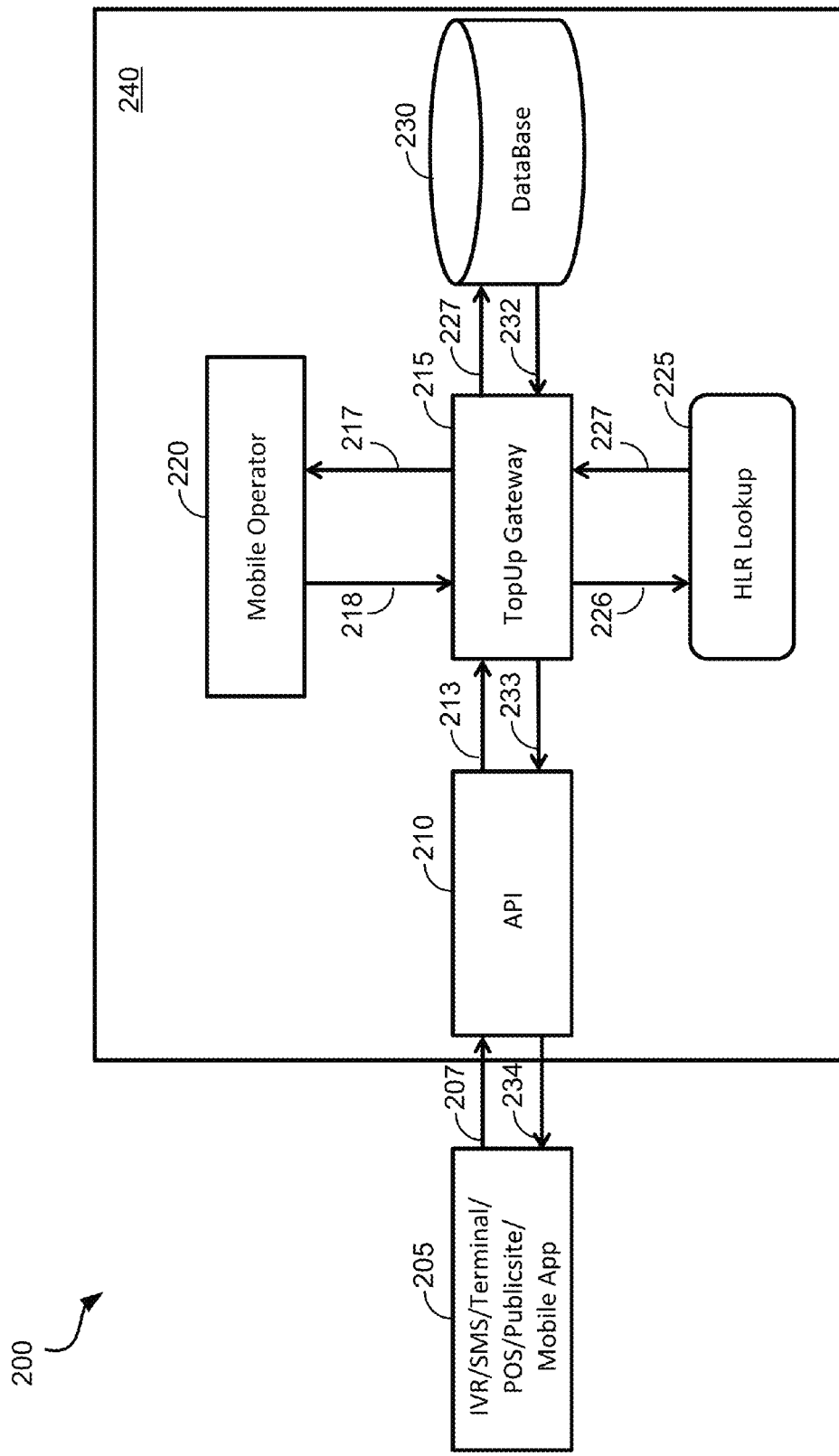
FIG. 2 is a high-level block diagram of a top-up system in accordance with an embodiment of the disclosure.

FIG. 2 is a more detailed block diagram 200 of a top-up system 100 having a top up application 130 in accordance with an embodiment of the disclosure. The top up application 130 receives a request from an interface module 205, such as, a phone user via the IVR, terminal, point of sale (POS), website on the internet, mobile application, etc., for processing a top-up, recharge, addition, and/or transfer of telephone minutes or money to a phone user's account for using a telephone service. The phone user also inputs a phone number associated with the phone user's account or another phone user's account and the number of phone minutes and/or monetary amount for topping up and/or transferring phone minutes and/or money.

At line 207, the top up application 130 communicates with an interactive voice response (IVR) system 240 to initiate an application programming interface (API) 210 that facilitates topping up and/or transferring phone minutes and/or money to a phone user's account. At line 213, the API 210 requests and provides the inputted phone number to a top-up gateway 215 to top-up and/or transfer phone minutes and/or money. At lines 217, 218, 226, 227, the top-up gateway 215 communicates with a home location register (HLR) look up service 225 to determine the telephone service company (e.g., MobiFone™, Telcel™, etc. that provides phone service) and/or the geographical location (e.g., Vietnam, Mexico, etc.), respectively, associated with the inputted phone number. A mobile (or any telephone service) operator 220 can communicated with the top-up gateway 215 to determine whether how many minutes and/or how much money a user has in the phone user's account. If the user's phone account has minutes and money, the mobile operator 220 provides phone service to phone user's telecommunication device (e.g., smartphone, cellular phone, etc.) that is registered with the phone number associated with the phone user's account.

The top-up gateway 215 verifies whether the phone user's account is a valid phone number having phone minutes and/or amount of money that can be top-up, recharge, add, and/or transfer the phone minutes and/or money into the phone user's account. The phone user can also top-up, recharge, add, and/or transfer the phone minutes and/or money from a purchased pin-based card into the phone user's account. Responsive to the top-up gateway 215 verifying that the phone user's account and/or the purchased pin-based card having a valid number of phone minutes and/or amount of money and obtaining information from the HLR lookup service 225 based on the inputted phone number, the top-up gateway 215 at lines 227, 232 tops up, recharges, adds, and/or transfers the phone minutes and/or money to a phone user's account associated with the inputted phone number and stores this information at a database 230 based on the phone number, and determined telephone service company.

The top up of phone minutes and/or money to the phone user's account can be accomplished by way of credit card, transfer of balance from one phone user's account to another phone user's account and pin-based calling card, among others. The top-up gateway 215 provides confirmation of the top-up, recharge, addition, and/or transfer of the phone minutes and/or money to the phone user via the API 210 and block 205 through lines 233, 234.

Alternatively or additionally, the top-up application 130 can notify the phone user whether the inputted phone number is new or previously inputted based on the phone user's historical inputted phone numbers. Alternatively or additionally, the top-up gateway 215 at lines 227, 232 tops up, recharges, adds, and/or transfers the phone minutes and/or money to a phone user's account associated with the inputted phone number and stores this information at a database 230 based on the phone number, determined telephone service company, and determined geographical location.

Figure 3:
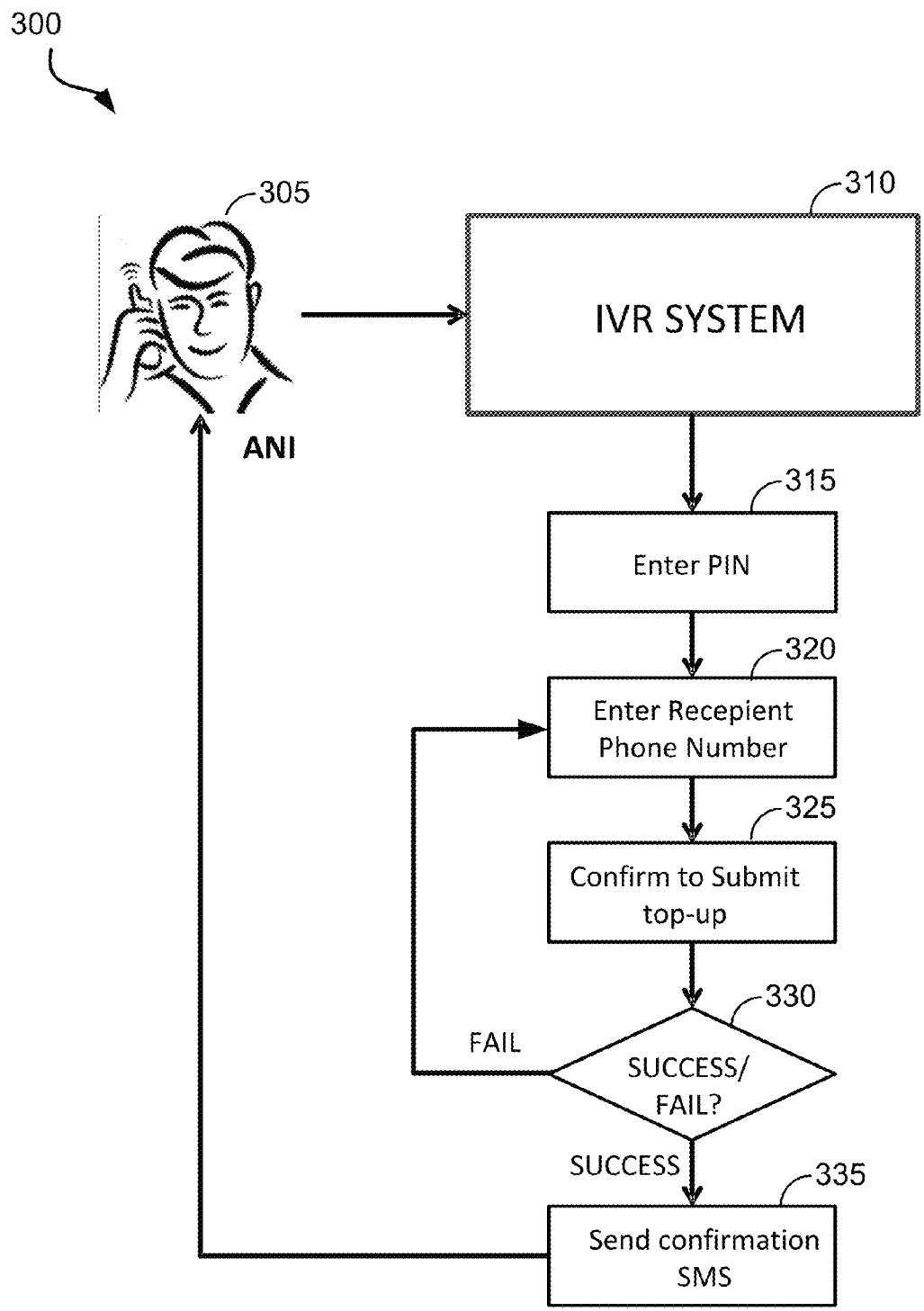
FIG. 3 is a flowchart for processing a top-up in a top-up system using an interactive voice response (IVR) system, and a pin and fixed denomination platform in accordance with an embodiment of the disclosure.

FIG. 3 is a flowchart 300 for processing a top-up in a top-up system 100 using an interactive voice response (IVR) system 310, and a pin and fixed denomination platform in accordance with an embodiment of the disclosure. A phone user 305 purchases a pin-based calling card that provides the phone user with a certain number of phone minutes or monetary amount. The phone user 305 calls an auto international top-up access number to interact with an IVR system 310 to start the top-up process. During the interaction, the IVR system 310 can determine an automatic number identification (ANI) from a calling number of the phone user 305. The IVR system 310 provides instructions to the phone user 305, which include instructing the phone user 305 to input a pin number for confirmation of the purchased pin-based calling card and input a recipient's phone number with a country code in accordance to an E.164 format, for example.

At blocks 315 and 320, the phone user inputs the pin number of the purchased pin-based calling card and the recipient's phone number, respectively. At block 325, the phone user 305 confirms the inputted information with the IVR system 310. At block 330, the IVR system 310 receives the submission from the phone user 305, confirms the pin number of the pin-based calling card, and processes the top-up that were previously described in connection to FIG. 2 based on the determined telephone service company associated with the recipient's phone number. If the top-up process is successful or unsuccessful, the IVR system 310 at block 335 can notify the phone user 305 of the successful or unsuccessful top-up via an audio message over the telephone and/or a SMS message.

Figure 4A:
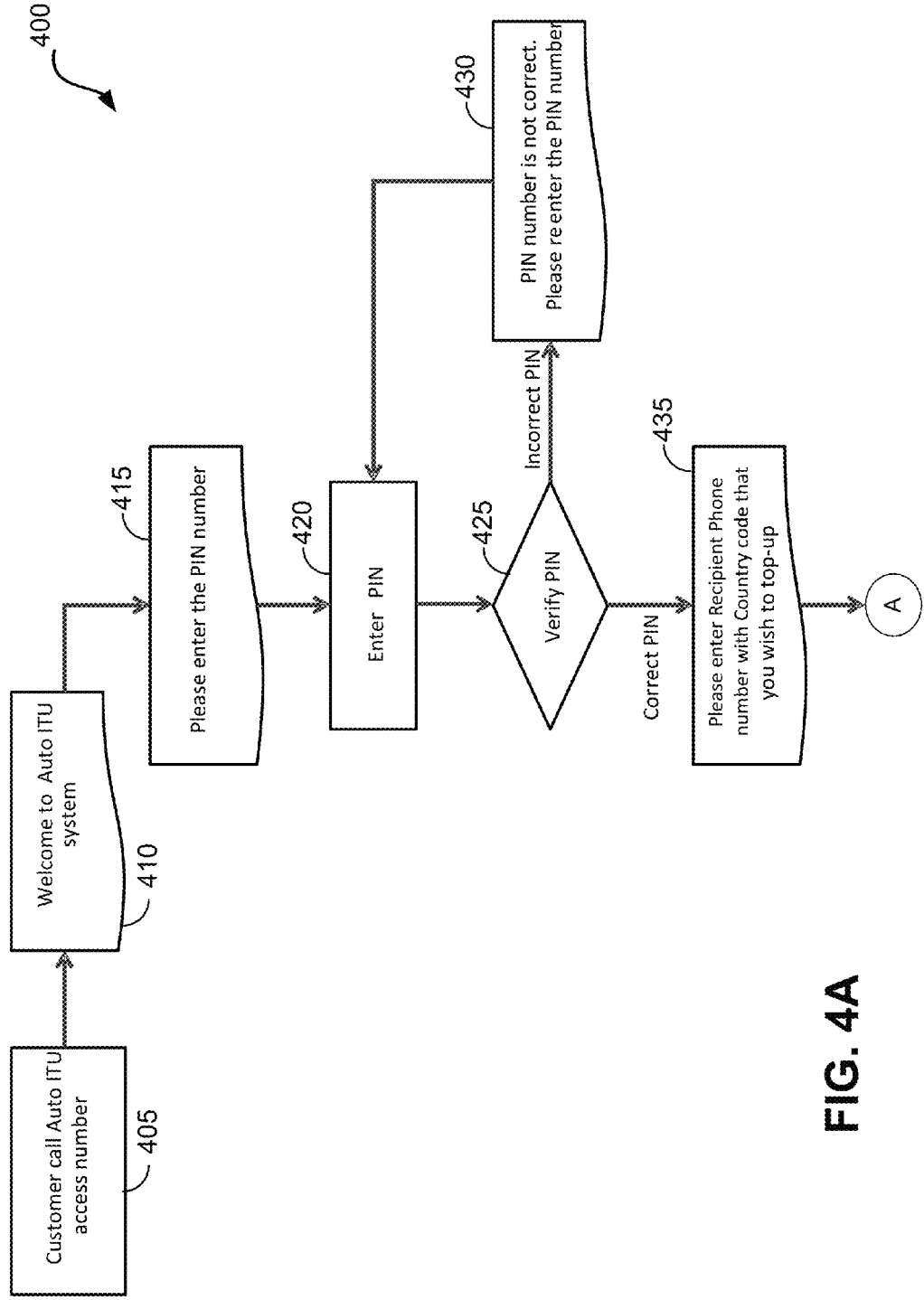
FIGS. 4A-B are more detailed flowcharts for processing a top-up in a top-up system using an interactive voice response (IVR) system, and a pin and fixed denomination platform in accordance with an embodiment of the disclosure.
Figure 4B:
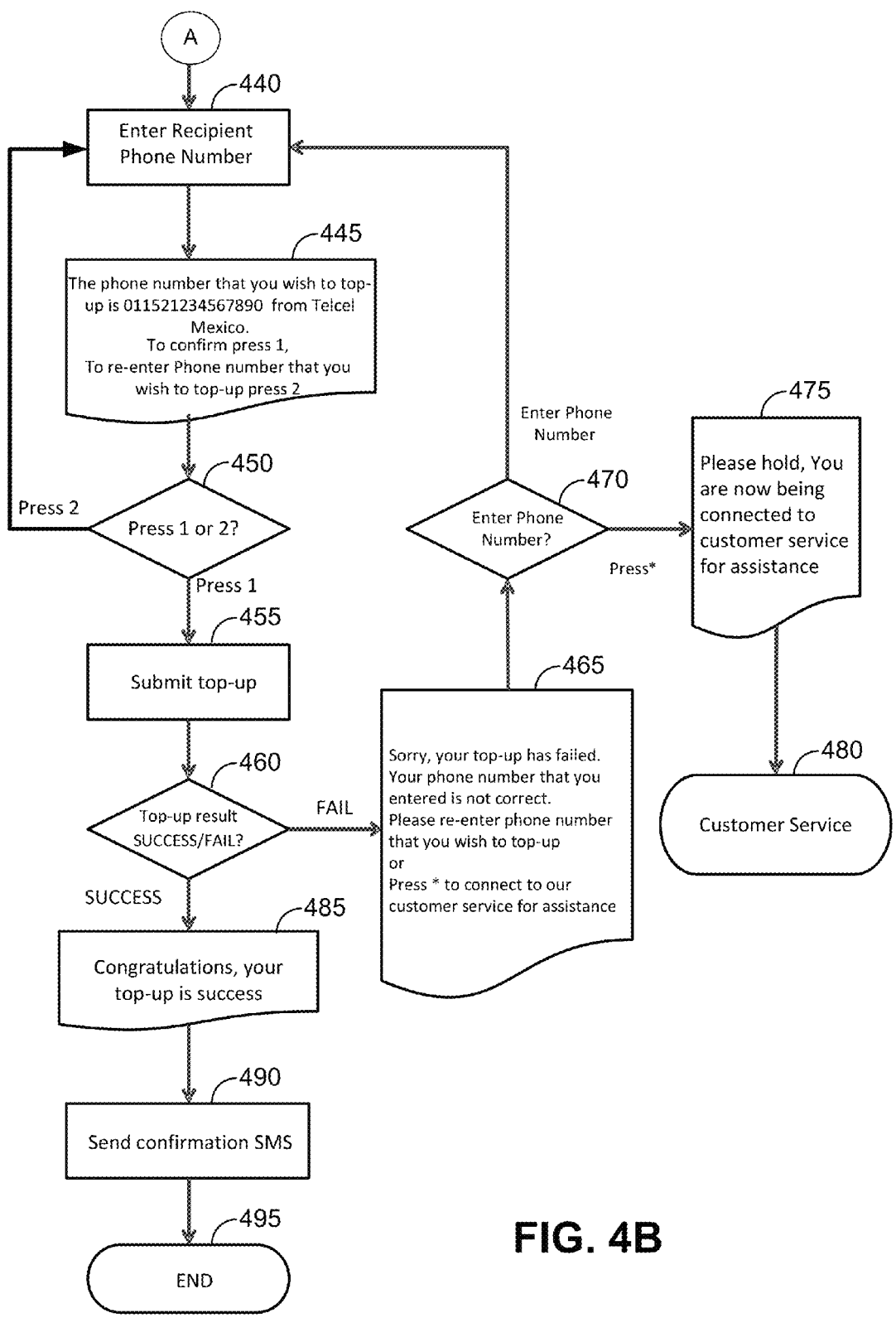

FIG. 4 is a more detailed flowchart 400 for processing a top-up in a top-up system 100 using an interactive voice response (IVR) system, and a pin and fixed denomination platform, such as that shown in FIG. 3. Referring to FIG. 4A and beginning with block 405, the phone user 305 calls an auto international top-up access number to interact with an IVR system 310 to start the top-up process. At blocks 410 and 415, the IVR system 310 welcomes the phone user 305 to the auto international top-up system, and requests for the pin number of the purchased pin-based calling card, respectively. At blocks 420 and 425, the phone user 305 inputs the pin number of the purchased pin-based calling card, and the IVR system 310 verifies the pin number, respectively. Responsive to verifying the pin number to be incorrect, the IVR system 310 at block 430 notifies the phone user over the telephone that the pin number is incorrect and to re-enter the pin number. At this point, the top-up process repeats blocks 420 and 425 until the verification of the pin number is correct.

Responsive to verifying the pin number to be correct, the IVR system 310 request the phone user 305 to input the recipient's phone number with the country code that the phone user wish to top-up. At block 440 in FIG. 4B, the phone user 30 enters the recipient's phone number. At block 445, the IVR system 310 confirms the inputted information with the phone user 305 by playing an audio confirmation message. For example, during a telephone IVR session, the IVR system 310 can request the user to press the number 1 on his phone responsive to the playback of the recipient's phone number is correct. Responsive to the phone user 305 pressing number 2 on his phone, the top-up process repeats blocks 435, 440, and 445.

Responsive to the phone user 305 pressing number 1 on his phone, the phone user 305 submits a number of phone minutes or a monetary amount to the IVR system 310 to be topped up at the recipient's phone number. The IVR system 310 processes the top-up that were previously described in connection to FIG. 2 based on the determined telephone service company associated with the recipient's phone number. If the top-up process is successful or unsuccessful, the IVR system 310 at block 335 can notify the phone user 305 of the successful or unsuccessful top-up via an audio message over the telephone and/or a SMS message. If the top-up process is successful, the IVR system 310 at block 485 can notify the phone user 305 of the successful top-up via an audio message over the telephone. At block 490, the IVR system 310 can send a SMS message notifying the phone user 305 of the successful top-up.

If the top-up process is unsuccessful, the IVR system 310 at block 465 can notify the phone user 305 of the unsuccessful top-up via an audio message over the telephone and request for re-retry of the recipient's phone number or press "*" to connect to a customer service representative for further support. At block 470, the IVR system 310 determines whether the phone user 305 presses "*" or the recipient's phone number. Responsive to the phone user 305 pressing the recipient's phone number, the top-up process repeats blocks 440, 445, 450, 455, and 460. Responsive to the phone user 305 pressing "*" on his phone, the IVR system 310 connects the phone user 305 to a customer service representative at blocks 475 and 480.

Figure 5:
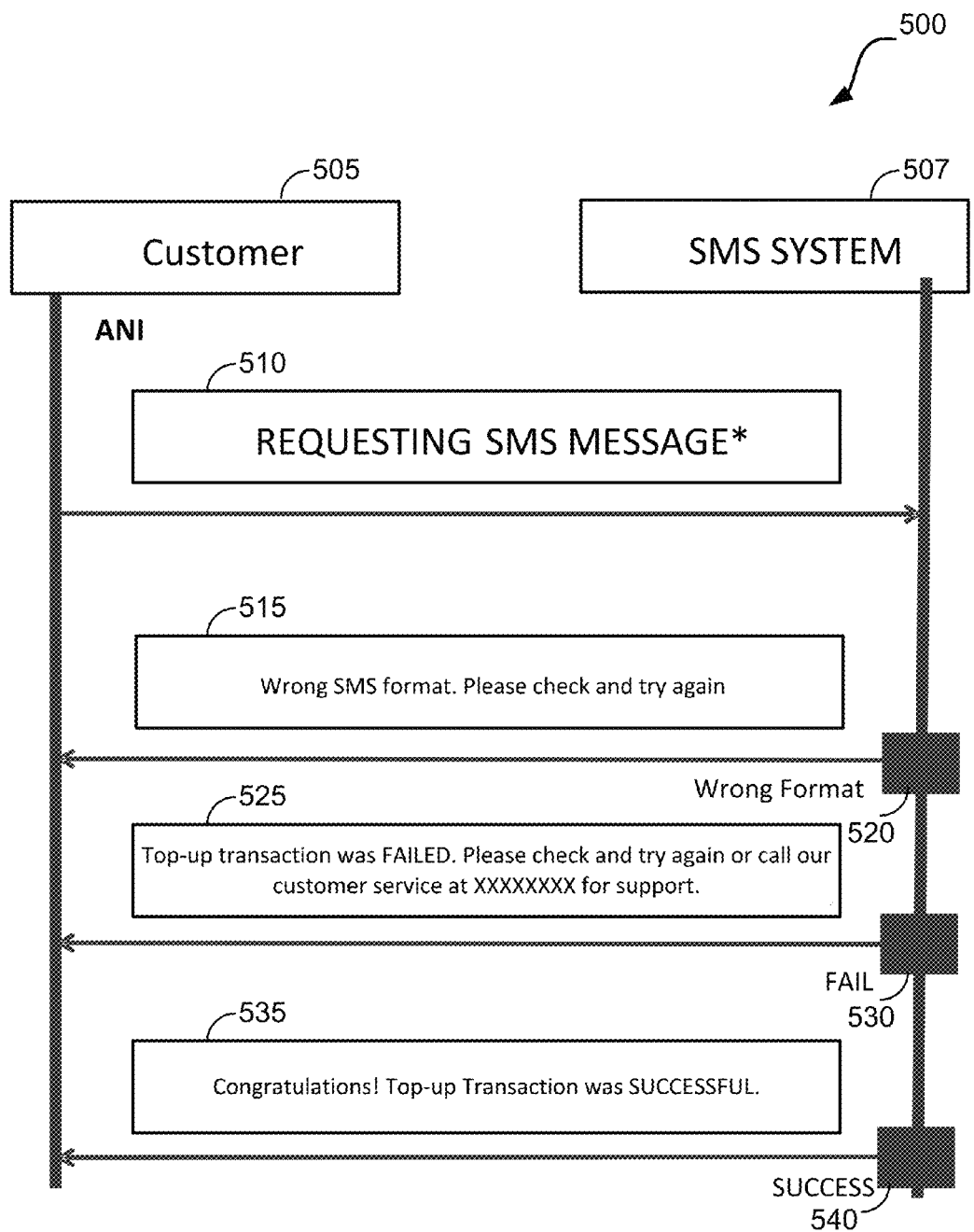
FIG. 5 is a flowchart for processing a top-up in a top-up system using a short message system (SMS), and a pin and fixed denomination platform in accordance with an embodiment of the disclosure.

FIG. 5 is a flowchart 500 for processing a top-up in a top-up system 100 using a short message system (SMS) 507, and a pin and fixed denomination platform in accordance with an embodiment of the disclosure. A customer 505 can request for a top-up to a recipient's phone number using a SMS system 507. The customer 505 can request for a top-up by entering a top-up format in the SMS message. The top-up format can include a pin number, a recipient's phone number, and a space in between the numbers, or a top-up command code, a pin number, a recipient's phone number, and spaces in between the code and numbers.

At block 520, the SMS system 507 can determine whether the top-up format is correct or wrong. At block 515, responsive to the SMS system 507 determining that the top-up format is wrong, the SMS system 507 notifies the user that the SMS format is wrong, requests the customer 505 to check the SMS format and try again. At block 530, responsive to determining that the SMS format is correct, the SMS system 507 can determine whether the top-up transaction was successful or not is correct or wrong. At block 525, responsive to the SMS system 507 determining that the top-up transaction failed, the SMS system 507 notifies the user that the top-up transaction has failed and requests the customer 505 to try again or call customer service for further support, such as that shown in block 525. At block 535, the SMS system 507 processes the top-up that were previously described in connection to FIG. 2 based on the determined telephone service company associated with the recipient's phone number. Responsive to the SMS system 507 determining that the top-up transaction was successful, the SMS system 507 notifies the user that the top-up transaction was successful, such as that shown in block 535.

Figure 6:
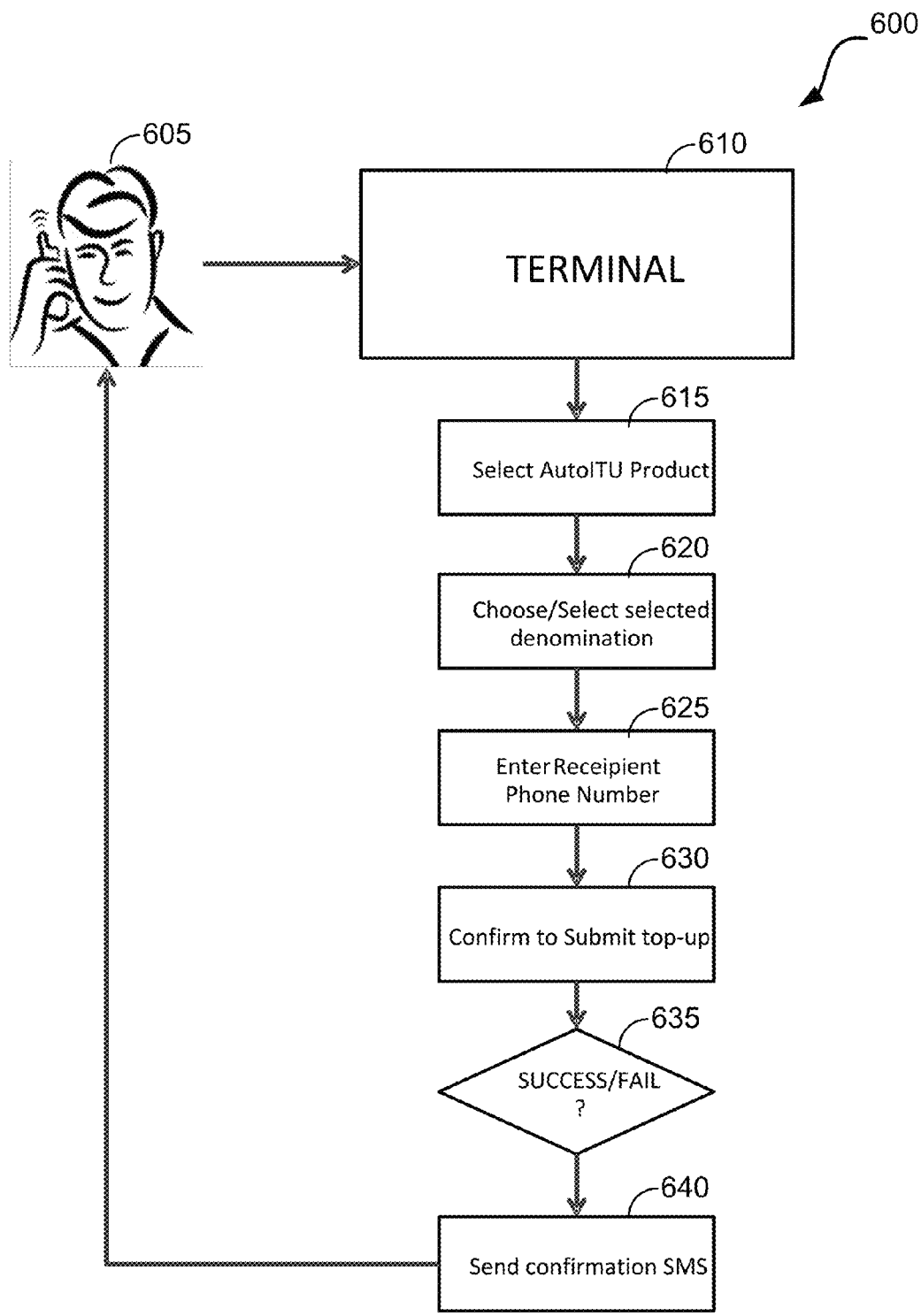
FIG. 6 is a flowchart for processing a top-up in a top-up system using a real time refill (RTR) and select denomination platform in accordance with an embodiment of the disclosure.

FIG. 6 is a flowchart 600 for processing a top-up in a top-up system 100 using a real time refill (RTR) and select denomination platform in accordance with an embodiment of the disclosure. A phone user 605 accesses a phone user's account using a terminal 610 to start a top-up transaction. The phone user's account is assumed to have a certain number of phone minutes or monetary amount. At block 615, the phone user 605 selects an auto international top-up product displayed on the terminal 610. During the interaction at the terminal 610, the phone user 605 at block 620 can select a predetermined denomination (e.g., $5, $10, $15, $20, or $50) displayed on the terminal that the phone user 605 wishes to top-up.

At block 625, the terminal 610 can prompt the phone user 305 to input a recipient's phone number with a country code in accordance to an E.164 format. At block 630, the terminal 610 can display a confirmation screen displaying the selected denomination and the inputted recipient's phone number so that the phone user 605 can confirm that the information is correct. At block 635, responsive to the phone user 605 confirming that the information is correct, the terminal 610 receives the submission from the phone user 605 and processes the top-up that were previously described in connection to FIG. 2 based on the determined telephone service company associated with the recipient's phone number. If the top-up process is successful or unsuccessful, the terminal 610 at block 640 can notify the phone user 305 of the successful or unsuccessful top-up via a screen message on the terminal 610 and/or a SMS message.

Figure 7:
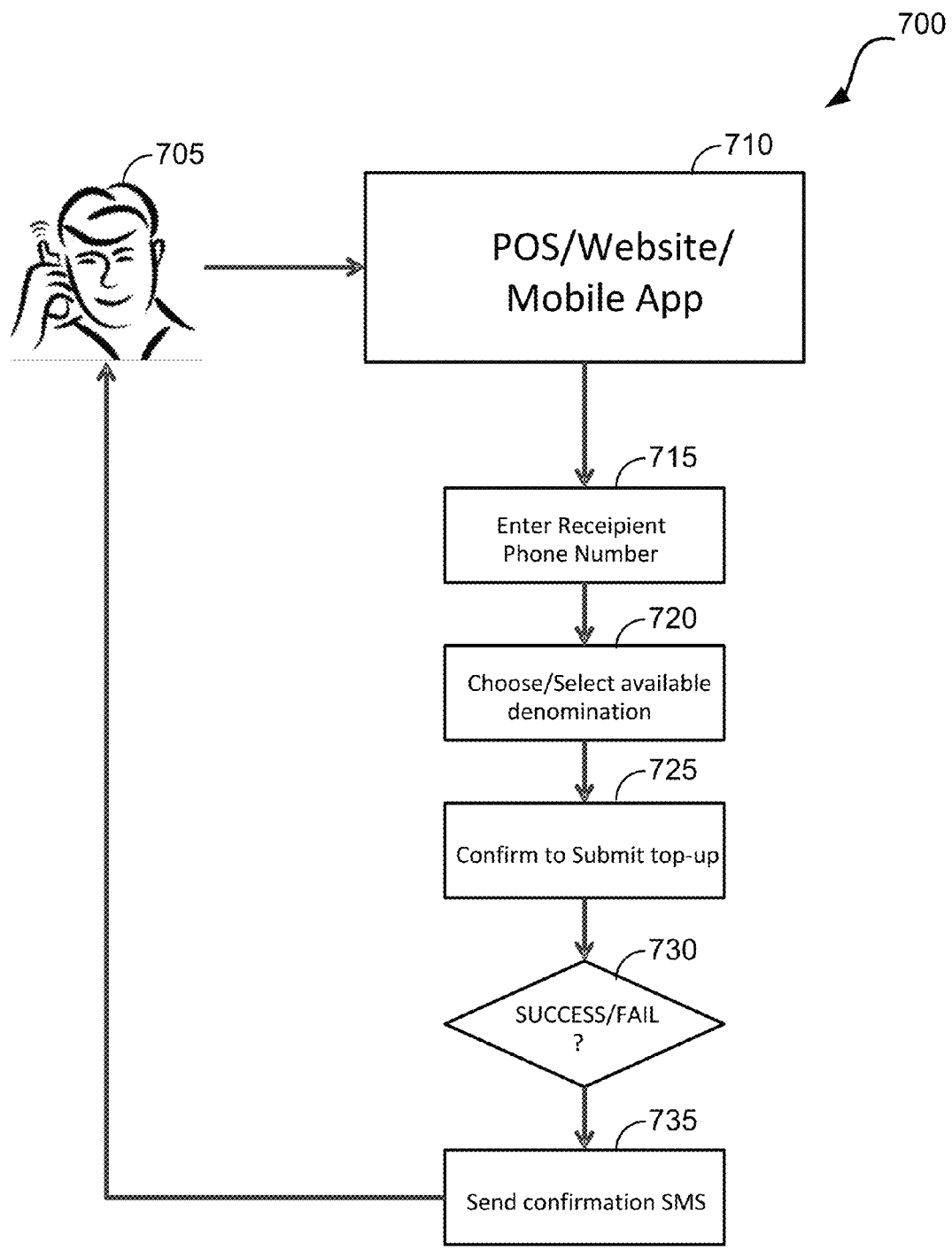
FIG. 7 is a flowchart for processing a top-up in a top-up system using an interactive application and open denomination platform in accordance with an embodiment of the disclosure.

FIG. 7 is a flowchart 700 for processing a top-up in a top-up system 100 using an interactive application 710 (e.g., a point of sale device, a website, or a mobile application) and open denomination platform in accordance with an embodiment of the disclosure. A phone user 705 accesses a phone user's account using the interactive application 710 to start a top-up transaction. The phone user's account has a certain number of phone minutes or monetary amount. During the interaction with the interactive application 710, the interactive application 710 at block 715 can prompt the phone user 705 to input a recipient's phone number with a country code in accordance to an E.164 format.

The phone user 705 at block 720 can select any denomination (e.g., $1-$500) that the phone user 705 wishes to top-up. The interactive application 710 at block 725 can display a confirmation screen displaying the selected denomination and the inputted recipient's phone number so that the phone user 705 can confirm that the information is correct. Responsive to the phone user 705 confirming that the information is correct, the interactive application 710 at block 730 receives the submission from the phone user 605 and processes the top-up that were previously described in connection to FIG. 2 based on the determined telephone service company associated with the recipient's phone number. If the top-up process is successful or unsuccessful, the interactive application 710 at block 735 can notify the phone user 705 of the successful or unsuccessful top-up via a screen message on the interactive application 710 and/or a SMS message.

Figure 8B:
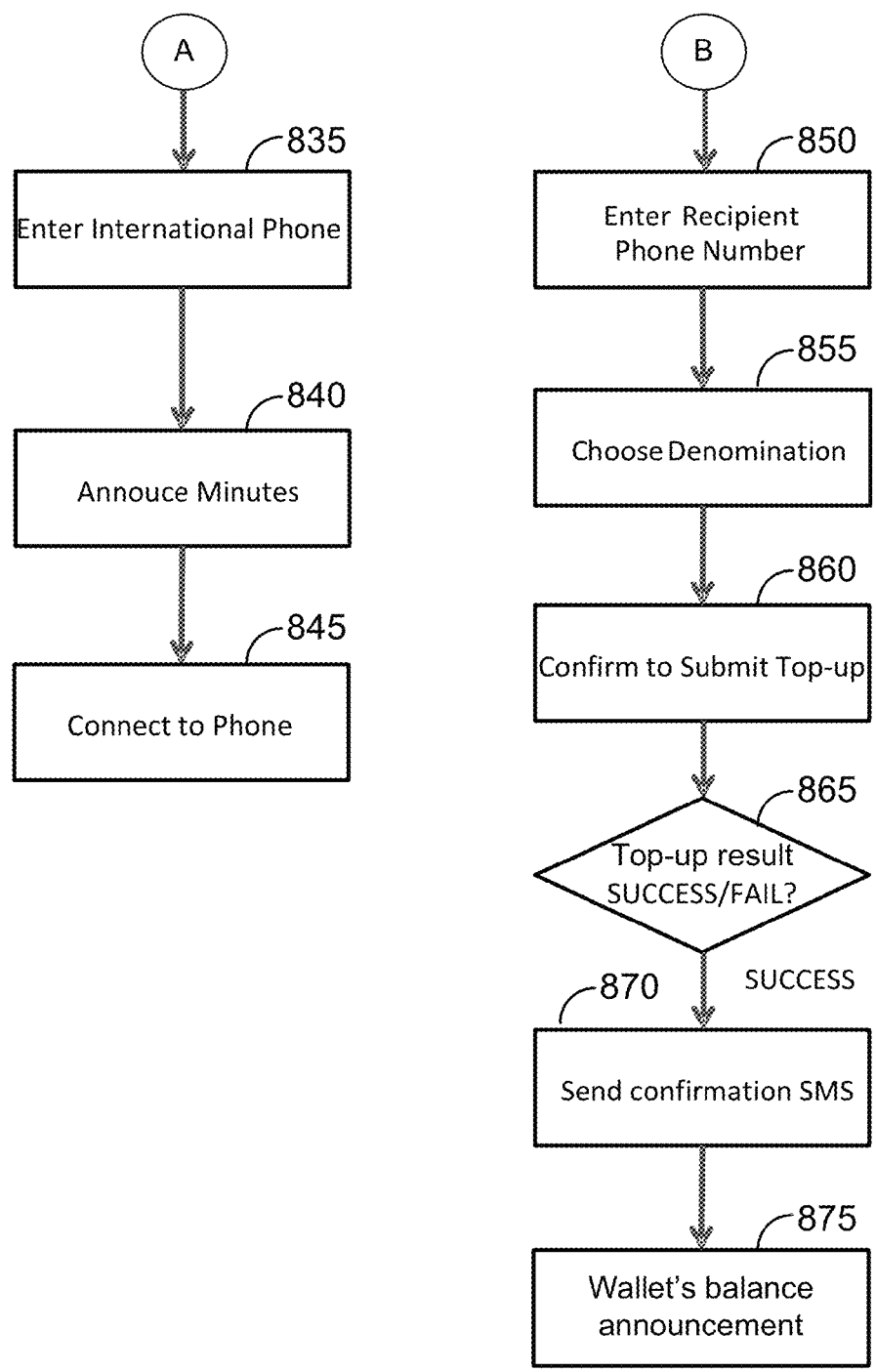

FIG. 8 is a flowchart 800 for processing a top-up and/or a money transfer in a top-up system 100 using a mobile wallet in accordance with an embodiment of the disclosure. A phone user 805 calls an access number to start a top-up or transfer transaction. The IVR system 810 at block 815 can determine an ANI Number and verify whether an ANI account exists or not. Responsive to determining that the phone user 805 will need to create a new account, the IVR system 810 at block 820 can request the phone user 805 to enter his pin number. Responsive to the IVR system confirming the pin number or determining that the phone user 805 has an existing account or POS account, the IVR system at block 825 provides a balance amount on the mobile wallet and at block 830 requests for transaction commands, such as call a phone number, or recharge a recipient's phone number/another user's mobile wallet. Responsive to selecting the option of calling a phone number, the IVR system at blocks 835, 840, 845 requests the phone user 805 to enter the outbound phone number, provides the number of phone minutes remaining on the ANI account, and connects the phone user 805 to the outbound phone number.

Responsive to the phone user 805 selecting the option of recharging a recipient's phone number, the IVR system at blocks 850 and 855 requests the phone user 805 to enter the recipient's phone number and chooses a denomination that the phone user 805 wishes to top-up. The IVR system at block 860 confirms with the phone user 805 the submitted information associated with the top-up transaction. Responsive to the phone user 805 confirming that the information is correct, the IVR system at block 865 receives the submission from the phone user 805 and processes the top-up that were previously described in connection to FIG. 2 based on the determined telephone service company associated with the recipient's phone number. If the top-up transaction is successful or unsuccessful, the IVR system at block 870 can notify the phone user 805 of the successful or unsuccessful top-up via an audio message and/or a SMS message. The IVR system at 875 can provide the remaining balance on the mobile wallet.

Figure 9A:
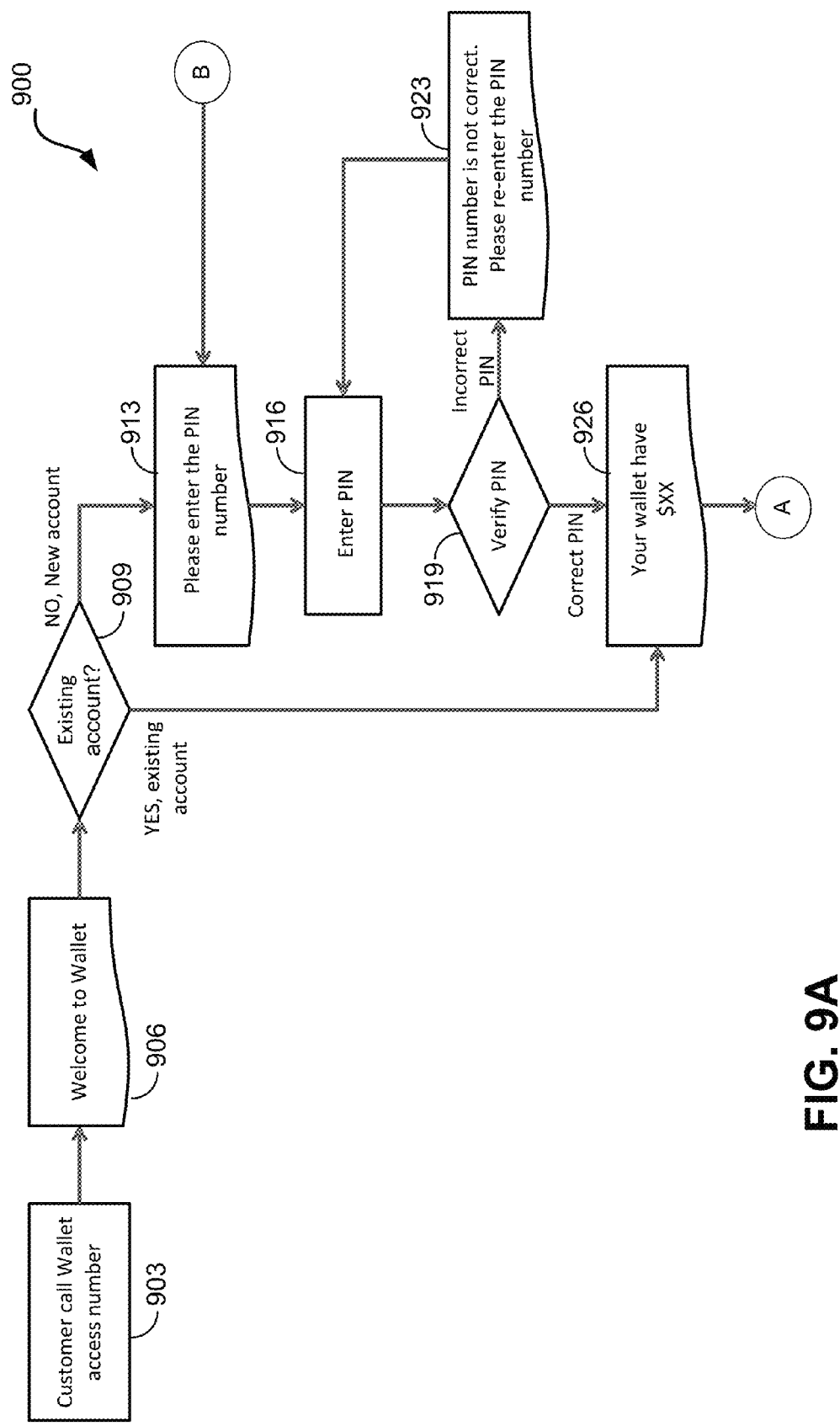
FIGS. 9A-C are more detailed flowcharts for processing a top-up and/or a money transfer in a top-up system using a mobile wallet in accordance with an embodiment of the disclosure.
Figure 9B:
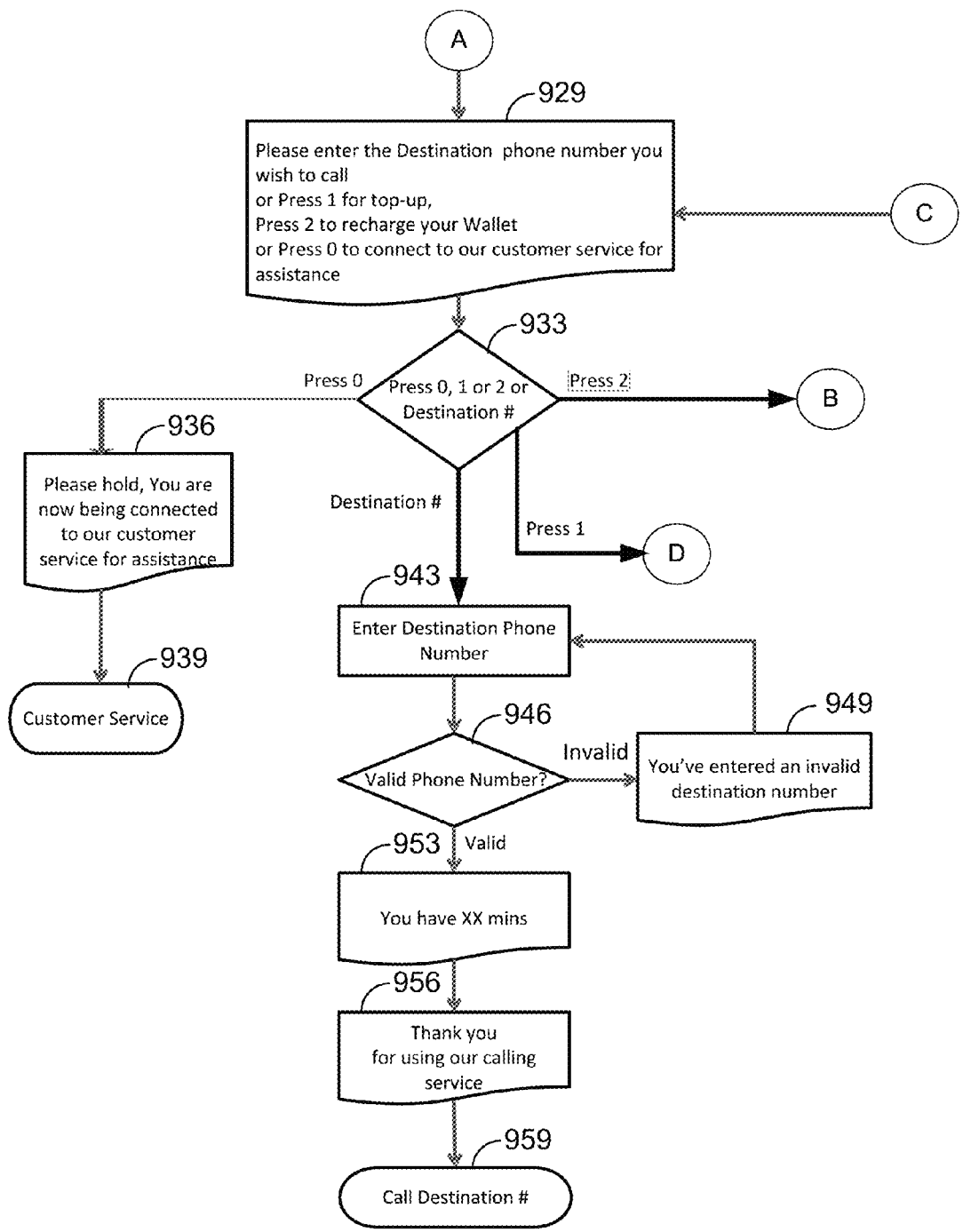
Figure 9C:
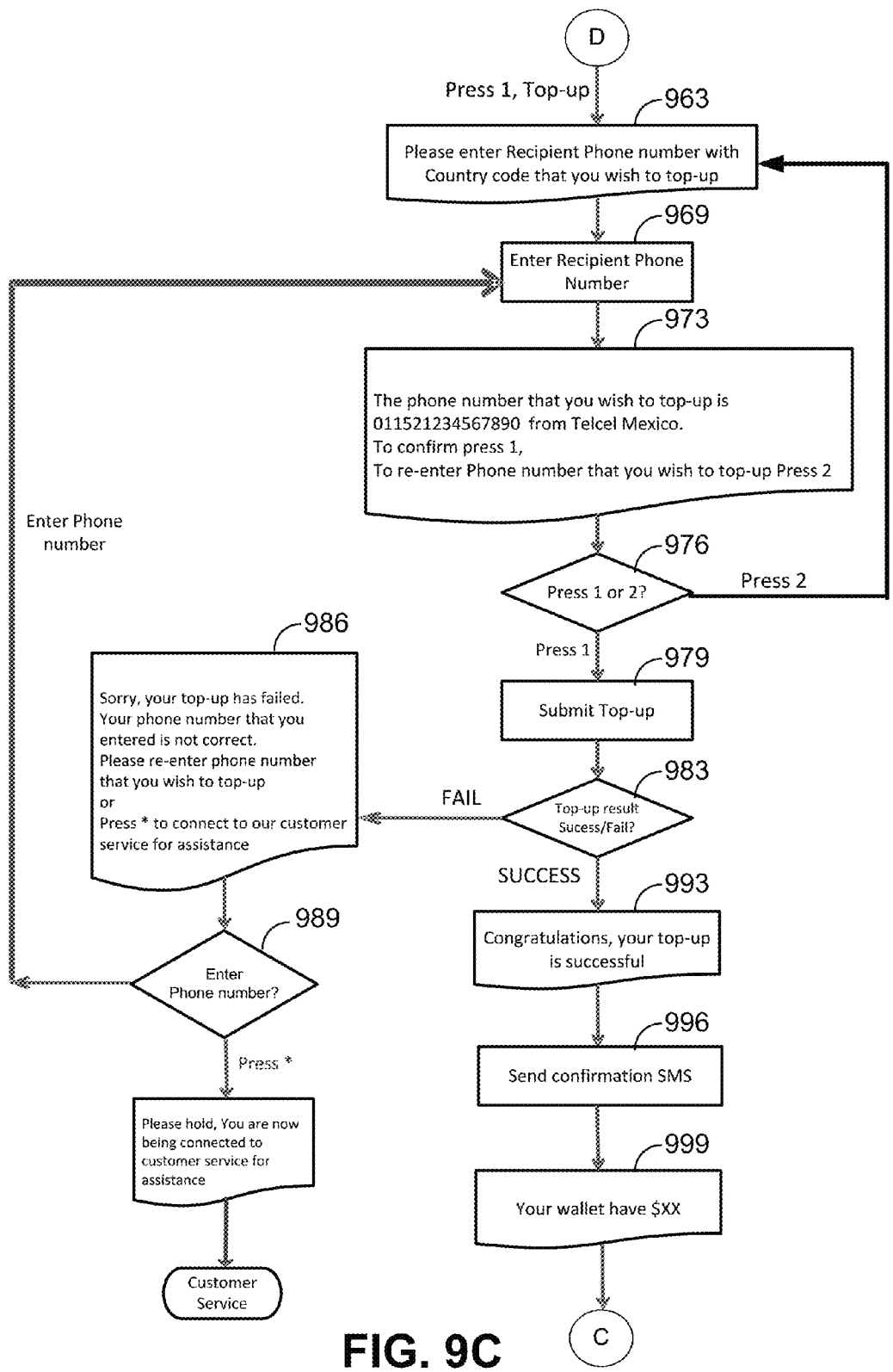

FIG. 9 is a more detailed flowchart 900 for processing a top-up and/or a money transfer in a top-up system 100 using a mobile wallet in accordance with an embodiment of the disclosure. At block 903, a phone user 805 calls an access number to start a top-up or transfer transaction. At block 906, the IVR system welcomes the phone user to the mobile wallet product. At block 909, the IVR system can determine an ANI Number and verify whether an ANI account exists or not. The IVR system can provide instructions to the phone user 805, including requesting the phone user 805 to enter his pin number at block 913. At block 916, the phone user enters the pin number and at block 919, the IVR system verifies the pin number. At block 923, responsive to the IVR system determining that the pin number is incorrect, the IVR system requests the phone user to re-enter the pin number and repeats blocks 916 and 919.

Responsive to the IVR system confirming that the pin number is correct, the IVR system at block 926 provides a balance amount on the mobile wallet and at block 929 requests for transaction commands, such as enter a destination phone number, press "1" to recharge a recipient's phone number, press "2" to recharge the phone user's mobile wallet or press "0" for customer service. At block 933, the IVR system determines the selected transaction commands. Responsive to selecting customer service, the IVR system at blocks 936 and 939 connects the phone user to a customer service representative. Responsive to selecting the option of calling a phone number, the phone user 805 at block 943 inputs a destination phone number to the IVR system. At block 946, the IVR system verifies whether the phone number is valid. Responsive to verifying that the phone number is invalid, the IVR system notifies the phone user of the invalid destination phone number at block 949 and repeats blocks 943 and 946. Responsive to verifying that the phone number is valid, the IVR system provides the number of phone minutes remaining on the ANI account, and connects the phone user 805 to the destination phone number at blocks 956 and 959.

Responsive to the phone user 805 selecting the option of recharging a recipient's phone number, the IVR system at block 963 requests the phone user to enter the recipient's phone number. At block 969, the phone user inputs the recipient's phone number into the IVR system. At block 973, the IVR system confirms the inputted recipient's phone number with the phone user, such as that shown in blocks 973 and 976. At block 979, the phone user submits a denomination that the phone user 805 wishes to top-up. At block 983, the IVR system receives the submission from the phone user 805 and processes the top-up that were previously described in connection to FIG. 2 based on the determined telephone service company associated with the recipient's phone number. If the top-up transaction is successful, the IVR system at block 993 can notify the phone user 805 of the successful top-up via an audio message and at block 996, send a SMS successful confirmation message. At block 999, the IVR system can provide the remaining balance on the mobile wallet and repeat the process at block 929. If the top-up transaction is unsuccessful, the IVR system at blocks 986 and 989 can notify the phone user 805 of the unsuccessful top-up via an audio message, request the phone user to enter the recipient's phone number, and repeat blocks 969, 973, 976, 979, and 983.

Figure 10:
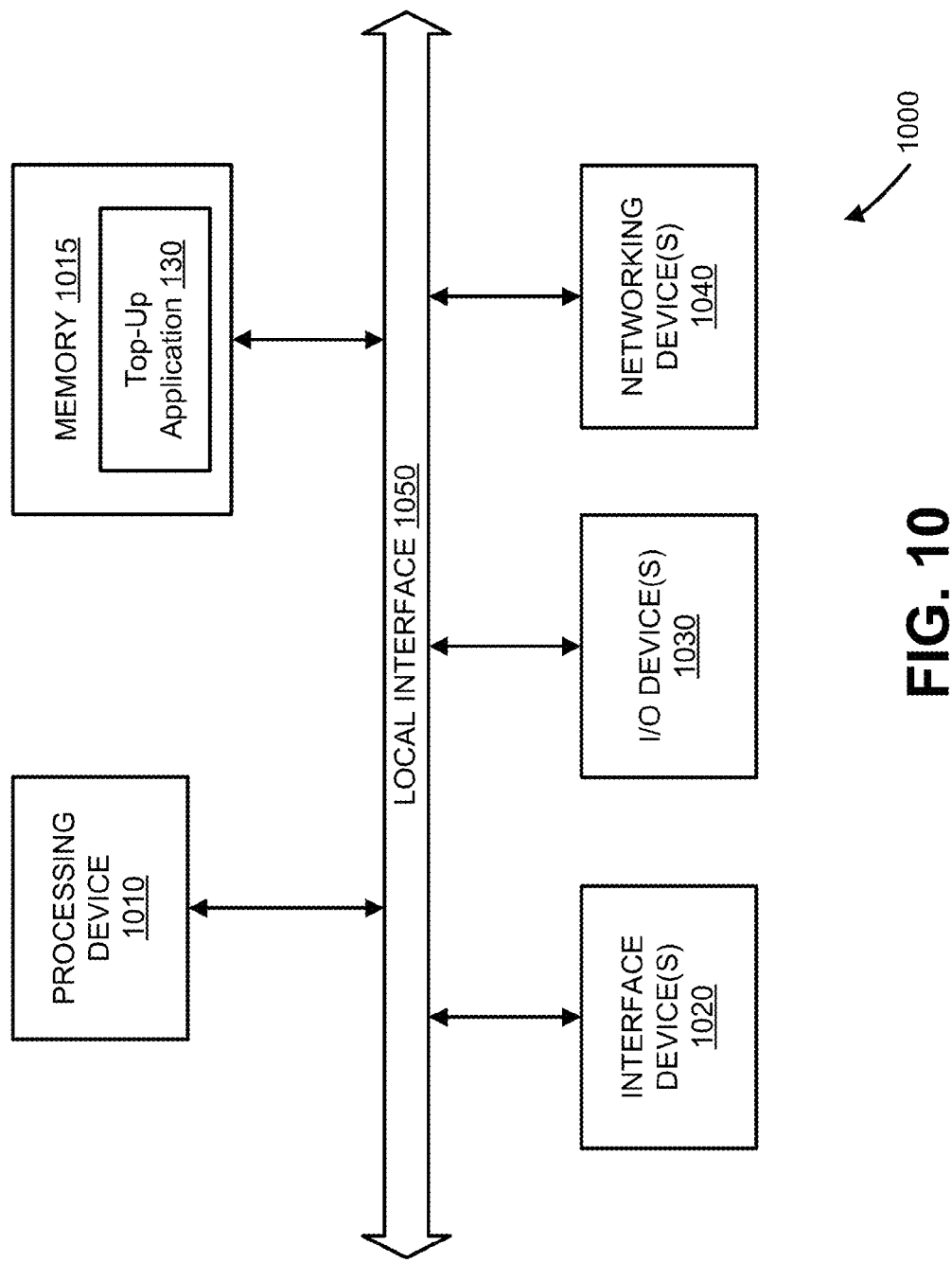
FIG. 10 is a block diagram that illustrates electrical components in a generic computing device in accordance with an embodiment of the disclosure.

FIG. 10 is a block diagram illustrating an exemplary architecture for a generic computer 1000 that is similar to the architecture of the computing devices 120, 125, 135, 140, 145, such as that shown in FIG. 1. As indicated in FIG. 10, the generic computer 1000 comprises a processing device 1010, memory 1015, one or more user interface devices 1020, one or more I/O devices 1030, and one or more networking devices 1040, each of which is connected to a local interface 1050. The processing device 1010 can include any custom made or commercially available processor, a central processing unit (CPU) or an auxiliary processor among several processors associated with the generic computer 1000, a semiconductor based microprocessor (in the form of a microchip), or a macroprocessor. The memory 1015 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 1020 comprise those components with which the user (e.g., administrator) can interact with the generic computer 1000. Where the generic computer 1000 comprises a server computer or similar device, these components can comprise those typically used in conjunction with a PC such as a keyboard, mouse, keypad, and terminal.

The one or more I/O devices 1030 comprise components used to facilitate connection of the generic computer 1000 to other devices and therefore, for instance, comprise one or more serial, parallel, small system interface (SCSI), universal serial bus (USB), or IEEE 1394 (e.g., Firewire™) connection elements. The networking devices 1040 comprise the various components used to transmit and/or receive data over networks 150, where provided. By way of example, the networking devices 1040 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 1015 normally comprises various programs (in software and/or firmware) including an operating system (O/S). The O/S controls the execution of programs, and provides scheduling, input-output control, file and data management, memory management, and communication control and related services. The memory 1015 further includes a calling setup application 225 that facilitates setting up an assigned number to call a calling number. This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A top-up system comprising:
   a user interface that receives a user input and transmits the user input that includes a recipient phone number associated with a phone user's account; and
   a top-up gateway that receives and transmits the phone number from the user interface and requests for a telephone service company associated with the phone number to a home location register (HLR) look up service, wherein the HLR look up service receives the phone number from the top-up gateway and the request for the telephone service company associated with the phone number,
   wherein the HLR look up service determines the telephone service company associated with the phone number and transmits the information related to the determined telephone service company to the top-up gateway,
   wherein the top-up gateway tops up phone minutes and/or balance of money of the phone user's account based on the phone number of the received user input and the determined telephone service company from the HLR look up service.

2. The top-up system as defined in claim 1, further comprising a database that receives and stores information related to the top up of the phone minutes and/or money of the phone user's account from the top-up gateway.

3. The top-up system as defined in claim 1, wherein the top-up gateway verifies whether the phone user's account is a valid phone number having phone minutes and/or amount of money that can be top-up, recharge, add, and/or transfer the phone minutes and/or money into the phone user's account.

4. The top-up system as defined in claim 1 wherein the HLR look up service receives the phone number from the top-up gateway and a request for the geographical location associated with the phone number from the top-up gateway, wherein the HLR look up service determines the geographical location associated with the phone number and transmits the information related to the determined geographical location to the top-up gateway, wherein the top-up gateway tops up phone minutes and/or balance of money of the phone user's account associated with the phone number based on the phone number, determined telephone service company and determined geographical location.

5. The top-up system as defined in claim 1, wherein the top-up gateway top-ups, recharges, adds, and/or transfers the phone minutes and/or money from a purchased pin-based card into the phone user's account.

6. The top-up system as defined in claim 1, wherein the top-up gateway provides a notification of whether the inputted phone number is new or previously inputted based on a phone user's historical inputted phone numbers.

7. The top-up system as defined in claim 1, wherein the top-up gateway facilitates processing a top-up and/or a money transfer in at least one of the following systems:
   a top-up system using an interactive voice response (IVR) system, and a pin and fixed denomination platform;
   a top-up system using a short message system (SMS), and a pin and fixed denomination platform; a top-up system using a real time refill (RTR) and select denomination platform;
   a top-up system using an interactive application and open denomination platform; and
   a top-up system using a mobile wallet.

8. A top-up application that is stored in a non-transitory computer-readable storage memory and has instructions that are executed by a processing device, the instructions including the following logics:
   receive a user input and transmit the user input that includes a phone number associated with a phone user's account;
   request for a telephone service company associated with the phone number from a home location register (HLR) look up service;
   receive information related to the requested telephone service company associated with the phone number from the HLR look up service; and
   top-up phone minutes and/or balance of money of the phone user's account associated with the phone number based on the phone number of the received user input, and the received telephone service company received from the HLR look up service.

9. The top-up application as defined in claim 8, further including the logic of storing information related to the top up of the phone minutes and/or money of the phone user's account.

10. The top-up application as defined in claim 8, further including the logic of verifying whether the phone user's account is a valid phone number having phone minutes and/or amount of money that can be top-up, recharge, add, and/or transfer the phone minutes and/or money into the phone user's account.

11. The top-up application as defined in claim 8, further including the logics of:
   requesting for a geographical location associated with the phone number from a home location register (HLR) look up service;
   receiving information related to the requested geographical location associated with the phone number from the HLR look up service; and topping up phone minutes and/or balance of money of the phone user's account associated with the phone number based on the phone number, received telephone service company, and received geographical location.

12. The top-up application as defined in claim 8, further including the logic of topping up, recharging, adding, and/or transferring the phone minutes and/or money from a purchased pin-based card into the phone user's account.

13. The top-up application as defined in claim 8, further including the logic of providing a notification of whether the inputted phone number is new or previously inputted based on a phone user's historical inputted phone numbers.

14. The top-up application as defined in claim 8, further including the logic of processing a top-up and/or a money transfer in at least one of the following systems:
   a top-up system using an interactive voice response (IVR) system, and a pin and fixed denomination platform;
   a top-up system using a short message system (SMS), and a pin and fixed denomination platform;
   a top-up system using a real time refill (RTR) and select denomination platform;
   a top-up system using an interactive application and open denomination platform; and a top-up system using a mobile wallet.

15. A computing device comprising:
   a processing device; and
   memory storing a top-up application which has instructions that are executed by the processing device, the instructions including the following logics:
      receive a user input and transmit the user input that includes a phone number associated with a phone user's account,
      request for a telephone service company associated with the phone number from a home location register (HLR) look up service, receive information related to the requested telephone service company associated with the phone number from the HLR look up service, and
      top up phone minutes and/or balance of money of the phone user's account associated with the phone number based on the phone number of the user input, and the received telephone service company from the HRL look up service.

16. The computing device as defined in claim 15, further including the logic of storing information related to the top up of the phone minutes and/or money of the phone user's account.

17. The computing device as defined in claim 15, further including the logic of verifying whether the phone user's account is a valid phone number having phone minutes and/or amount of money that can be top-up, recharge, add, and/or transfer the phone minutes and/or money into the phone user's account.

18. The computing device as defined in claim 15, further including the logics of:
   requesting for a geographical location associated with the phone number from a home location register (HLR) look up service;
   receiving information related to the requested geographical location associated with the phone number from the HLR look up service; and
   topping up phone minutes and/or balance of money of the phone user's account associated with the phone number based on the phone number, received telephone service company, and received geographical location.

19. The computing device as defined in claim 15, further including the logic of topping up, recharging, adding, and/or transferring the phone minutes and/or money from a purchased pin-based card into the phone user's account.

20. The computing device as defined in claim 15, further including the logic of providing a notification of whether the inputted phone number is new or previously inputted based on a phone user's historical inputted phone numbers.

* * * * *